COMMUNICATION SYSTEM USING CIRCULAR POLARIZATION
Filed Feb. 17, 1959 2 Sheets-Sheet 1
FIG. 1.
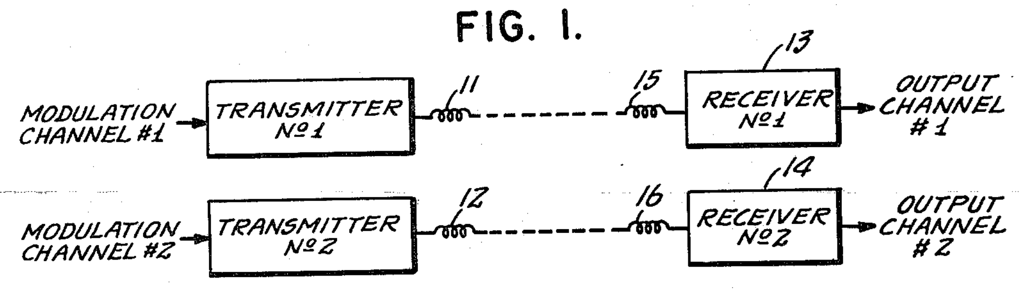
FIG. 2.
FIG. 2, FIG. 3.
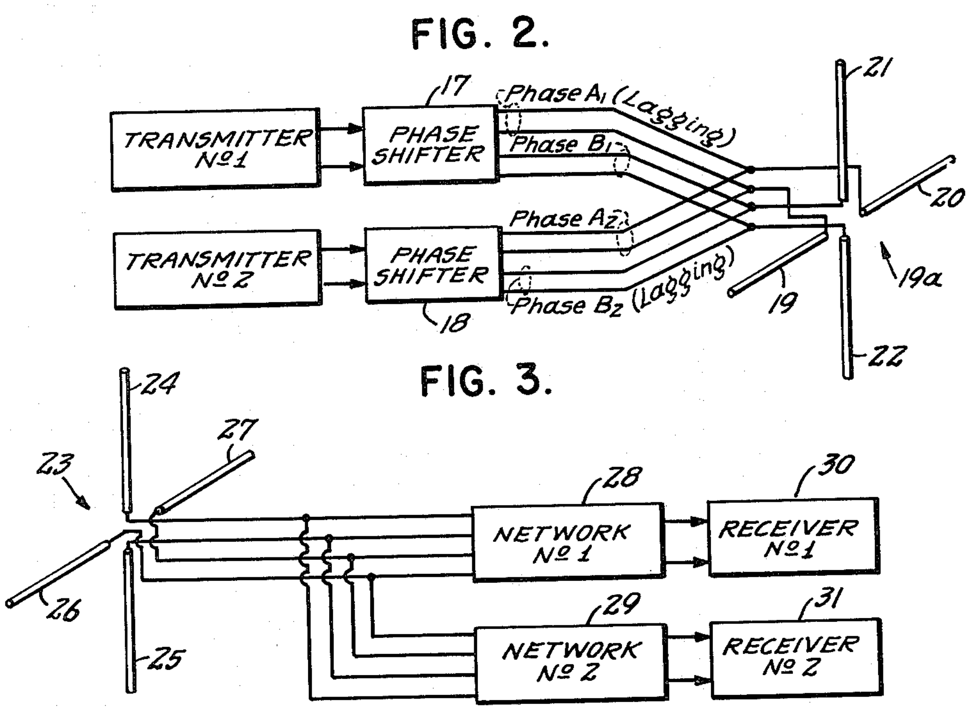
FIG. 4.
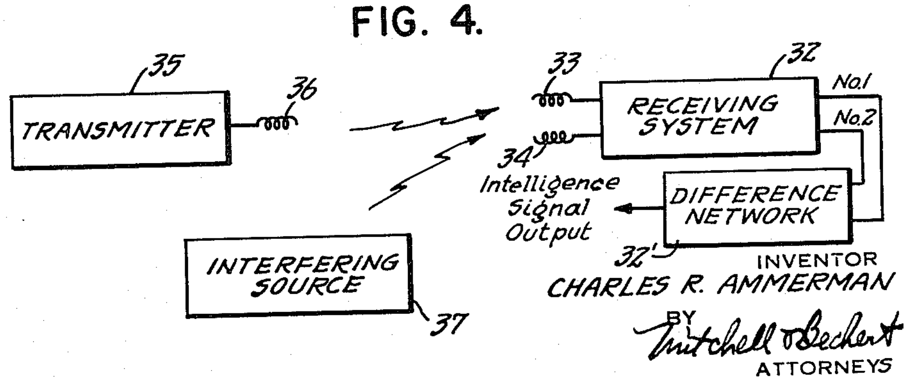
INVENTOR
CHARLES R. AMMERMAN
BY Mitchell & Bechert
ATTORNEYS

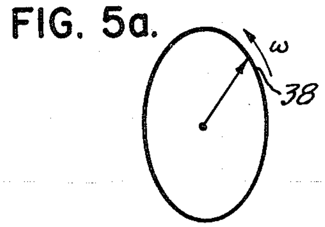
VECTOR REPRESENTATION OF E VECTOR IN ELLIPTICALLY POLARIZED WAVE
FIG. 5b.
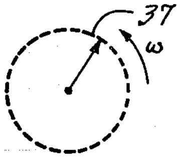
ONE CIRCULARLY POLARIZED COMPONENT
FIG. 5c.
SECOND (OPPOSITELY ROTATING) CIRCULARLY POLARIZED COMPONENT
FIG. 6.
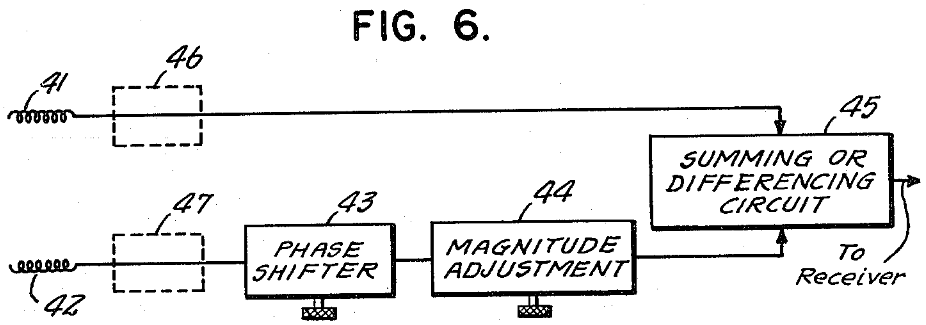
FIG. 7.
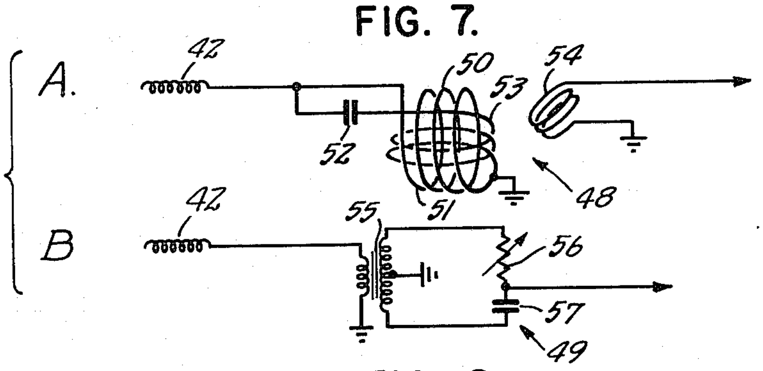
FIG. 8.
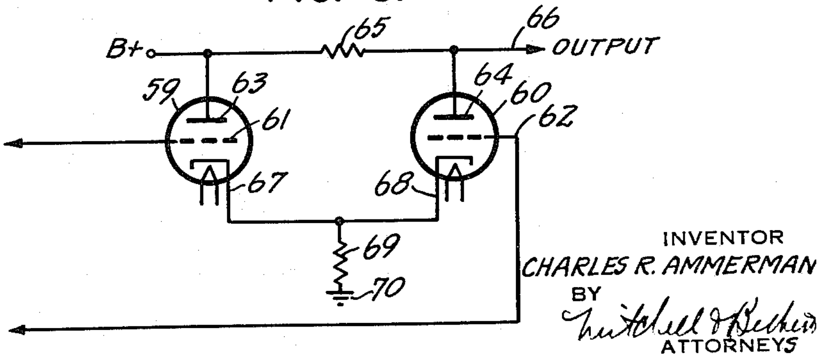
INVENTOR
CHARLES R. AMMERMAN
BY
Mitchell & Bechert
ATTORNEYS United States Patent Office 3,093,824
Patented June 11, 1963

3,093,824

COMMUNICATION SYSTEM USING CIRCULAR POLARIZATION

Charles R. Ammerman, State College, Pa., assignor, by mesne assignments, to HRB-Singer, Inc., State College, Pa., a corporation of Delaware
Filed Feb. 17, 1959, Ser. No. 793,904
1 Claim. (Cl. 343—100)

This invention relates in general to a polarized system of communications and is particularly directed to a communications system of improved signal-to-noise ratio, employing circularly polarized radiation and detection techniques.

It is an object of the invention to provide an improved communication system lending itself to multiplexing of simultaneous signals on the same frequency bands.

Another object is to provide better signal-to-noise discrimination in a circularly polarized communication system.

Another object of the invention is to provide a circularly polarized communication system which makes possible an increase in the amount of information conveyed within a confined frequency band.

Another object of the invention is to provide in a circularly polarized communication system a transmitter comprising two complete channels of oppositely rotating polarized waves, and a receiver so adapted to receive the waves as to render a degree of secrecy or privacy in communication not capable otherwise.

Another object of this invention is to provide an improved circularly polarized communications system having inherent noise-rejection features.

Another object of the invention is to provide an improved multiplexed communications system which is efficient, stable, simple and economical to operate.

Other objects and advantages of the invention will become more apparent from a study of the following specification.

In general, communication systems involve the use of carrier waves having signals impressed thereon in accordance with a given type of modulation, such as amplitude, frequency, or pulse modulation. Such means of transmission are limited in the number of communication channels that may be used in the given frequency band allocated by law. To increase the number of channels and still retain the same band frequency requirements, a circular polarization system of communications is contemplated whereby there is effected simultaneous transmission and reception of two circularly polarized radiations having opposing senses, both being transmitted in the same frequency band.

Since the two receiving systems are separately and respectively responsive to oppositely rotating circularly polarized transmissions, even though at the same frequency, the original basic modulating intelligence on both transmissions is readily separated. For the case of a single transmission of circularly polarized radiation, and with the two receiving systems responsive to oppositely polarized waves, enhanced signal-to-noise discrimination is achieved.

In one general form to be described, I employ separate antennas that are responsive to circularly polarized radiation rotating in opposite directions. In another general form, a single antenna system is common to the right-hand polarized and to the left-hand polarized parts of the system, reliance being had on suitable phase-sensitive circuits to separate the respective oppositely polarized signals.

In the accompanying drawings:

FIG. 1 shows schematically a pair of transmitters and receivers each operating in the same frequency band, one using right hand circular polarization and the other left hand circular polarization according to the invention;

FIG. 2 shows a pair of transmitters each operating in the same frequency band, with their respective output signals phase-shifted so as to excite a single antenna array, the combination of phase shifting and antenna array being made to reproduce left hand and right hand circularly polarized waves.

FIG. 3 shows a single polyphase antenna array for receiving right hand and left hand circularly polarized signal from a pair of transmitters and suitable network filters for separating the signals prior to feeding the individual receivers when the signals are demodulated and processed.

FIG. 4 shows a system for transmitting a single circularly polarized wave in one direction and a system for receiving the transmitted circularly polarized wave and signals from an interfering source, the interference signals being cancelled out in the said receiving system.

FIGS. *5a*, *5b*, and *5c* are vector diagrams of an elliptically polarized wave representing an interference signal and a pair of circularly polarized components resolved therefrom rotating in opposing senses and of different amplitudes.

FIG. 6 is a diagram of a receiving system using a pair of antennas each of which respond to circularly polarized waves of opposite rotational sense, one antenna system having phase and amplitude adjustment means, and a summing or differencing circuit for receiving and comparing the polarized signals.

FIGS. 7A and 7B are representative circuit diagrams of various methods for producing phase shifts of electrical signals in the circuit of FIG. 6.

FIG. 8 shows a representative circuit diagram of one form of a difference circuit for use in the circuit of FIG. 6.

Now referring to the drawings and particularly to FIG. 1, there is shown therein a pair of transmitters No. 1 and No. 2 each modulated in accordance with any of the well known methods of modulations such as AM, FM, pulse-time modulation and the like. Each of the transmitting channels terminates in an antenna 11 and 12, each disposed to transmit circularly polarized signals, antenna 11 being polarized in a direction to transmit left-hand circularly polarized waves, and antenna 12 being polarized in a direction to transmit right-hand circularly polarized waves. A suitable receiving system is provided and comprises a pair of receivers 13 and 14 each having appropriate antennas 15 and 16 polarized in a direction to receive the left and right-hand circularly polarized transmitted waves. In the above type of transmission, both the transmitting and receiving channels for left and right-hand circularly polarized waves are kept separate and distinct, there being no intermixing between the two channels. However, in FIG. 2, there is shown a novel method for combining the outputs of two transmitters. The outputs are phased so as to feed the antenna array shown in FIG. 2 in a manner necessary to produce the proper right-hand and left-hand circularly polarized waves.

In FIG. 2 the output signal from transmitter No. 1 is passed through a phase shifter 17 which provides two output signals generally designated phase A1 (lagging) and phase B1, meaning that phase A1 is always lagging phase B1 by 90°, so that if phase A1 is designated $\alpha$, then phase B1 is $\alpha+90°$. This can be accomplished in any conventional and suitable manner common in the art. Similarly, transmitter No. 2 provides an output signal which passes through phase shifter 18, the output thereof resulting in a pair of signals generally designated phase A2 and phase B2 (lagging), meaning that phase B2 is always lagging phase A2 by 90°, so that if phase A2 is designated $-\alpha$, then phase B2 is $\alpha+90°$. Phase A1 and phase A2 signals are fed to an antenna array 19*a* composed of a pair of horizontal antenna radiators 19 and 20. Similarly, phase B1 and phase B2 signals are fed to the vertical antenna radiators 21 and 22 of the antenna array 19*a*. Signals having phase A1 and B1 in combination when fed to the vertical and horizontal radiators, produce a circularly polarized signal in one direction, and the signals having phases B2 and A2 when combined and similarly fed to the antenna radiators, produce a circularly polarized signal in the opposite direction. Hence, in this manner of phasing signals, a pair of circularly polarized signals rotating in opposing senses is produced which eliminates the need for separate transmission antennas as shown in FIG. 1. The circularly polarized signals transmitted by the polyphase antenna array shown in FIG. 2 may be received by a pair of antennas as shown in the right-hand portion of FIG. 1, or by a polyphase antenna array as shown in FIG. 3.

In FIG. 3 an antenna array 23 is provided which is similar in design and oriented in the same direction as the antenna array 19*a* in FIG. 2. For convenience, the elements 24—25 are mounted vertically and elements 26—27 are mounted horizontally and are disposed to receive components of the circularly polarized waves of both senses of rotation. The polarized transmissions are separated by suitable network filters 28 and 29, respectively, responsive to a circularly polarized wave of one sense and a circularly polarized wave of the opposite sense; for example, network 28 may be responsive to the right-hand polarized transmission, and network 29 may be responsive to the left-hand polarized transmission. The respective outputs of filters 28 and 29 are then transmitted to receivers 30 and 31 for appropriate processing in the normal and usual manner. Thus, dual communication channels become multiplexed in the frequency band customarily required for one channel.

The systems of FIGS. 1 and of FIGS. 2–3 will be seen to possess certain unique advantages, particularly from the viewpoint of security against reception by poacher receivers. For example, a poacher reciever with an ordinary plane-polarized antenna, or in general an antenna which is not precisely adjusted to receive the polarization of one transmitter, will recieve both transmitters. Furthermore, if the receiver is off the transmit-receive axis, the apparent polarization transmitted will be elliptical and not circular. This means that, to the would-be poacher, both channels would appear to interfere with one another, so that a degree of secrecy or privacy of transmission is obtained. To enjoy this obvious advantage, it is necessary to have both channels operating simultaneously, and of course the modulations must be different on the two channels. However, if one channel is idle, a dummy transmission can be made, such as a single tone or some noise.

External noise generated by ignition systems and the like or static noise generated by the elements is ordinarily strongly polarized in the vertical plane; other forms of noise may be strongly polarized in the horizontal. In general, however, external noise is polarized strongly in one of two given planes, namely vertical or horizontal. In such cases, any circularly polarized antenna receiving system will respond to only one component of the noise, thus assuring a noise-reduction factor of approximately 3 db by the mere employment of a single-channel circularly polarized system. In accordance with the invention, still further noise reduction is inherently achievable, and FIGURE 4 will serve for purposes of illustration.

In general, the system of FIG. 4 comprises a receiving system 32 having antennas 33 and 34 respectively disposed to receive left-hand and right-hand circularly polarized waves; the receiving system 32—33—34 may thus be as described in connection with FIG. 3 or in connection with the right half (13—15, 14—16) of FIG. 1. A transmitter 35 generates a signal which in combination with antenna 36 produces a single (e.g. right or left-hand) circularly polarized wave with modulated intelligence impressed thereon. One of the receiving system antennas will be responsive to only the waves transmitted by transmitter 35 since only one circularly polarized wave is transmitted. For purposes of illustration, assume antenna 36 transmits only a right-hand circularly polarized wave and antenna 33 is responsive only to such right-hand waves; under these conditions, antenna 33 receives the intelligence-modulated signals, and antenna 34 will receive no intelligence-modulated signals, so that all the detected intelligence is available in the output channel labeled No. 1, and none of this intelligence appears in channel No. 2. Now, should an interfering source 37 transmit plane-polarized signals of the same frequency as the transmitting source 35, it is possible for antennas 33 and 34 (and, therefore, both channels No. 1 and No. 2) to generate a pair of equal voltages, although, of course, the above-noted 3 db noise reduction factor will be applicable to both these voltages. However, by subtracting both these voltages in the receiving system 32, as at difference network 32′, it is possible to eliminate the interference generated by source 37, so that only the wanted signal from transmitter 35 is received at the intelligence-signal output.

It may be appreciated that interfering signals may not always be plane polarized, but that they may, for example, be elliptically polarized. Even so, the receiving system of FIG. 4 achieves a measure of noise reduction, and the receiving arrangement of FIG. 6 may be even more effective.

An understanding of such noise reduction for elliptically polarized interference may be had by resolving a typical elliptically polarized wave into a pair of circularly polarized components having opposing senses of rotation. In this connection, FIGS. 5*a*, 5*b*, 5*c*, respectively, illustrate an elliptically polarized wave 38 and the two circularly and oppositely rotating component vectors 39 and 40. Generally, the elliptically polarized wave can be resolved into two circularly polarized components. There are, however, two special cases worthy of mention. In the first case, one of the circular components is zero; the resultant elliptically polarized wave is then reduced to a circle. In the second case, the two oppositely rotating components are equal and the resultant wave is reduced to a linearly polarized wave.

In order to enjoy the benefits of this invention, it is only necessary to utilize two polarizations which are orthogonal. In general terms, referring to the elliptically polarized wave, orthogonally would require that the major axes be perpendicular and that the predominant sense of rotation be opposite. This invention is described in terms of the circularly polarized case, because of associated practical advantages. The theory applies for two linear polarizations at right angles, or for any set of orthogonally polarized elliptical waves. Elliptical waves can be generated and received on the antennas of FIGS. 2 and 3 by using unequal fractions of phase A and phase B. As a result of the elliptical polarization of the interfering source, one component thereof will be received by antenna 33 and the other by antenna 34. These interfering signal waves may, to a certain extent, be cancelled by the receiving mechanism described in connection with FIG. 4, but I prefer to achieve further cancellation by making phase and amplitude adjustments, as will be described in connection with FIG. 6.

Of course, in the very special situation where the polarization in the plane normal to the antenna axis is circular, and is also in the same sense as the transmitted wave, such cancellation would be impossible. In this case, careful directional alignment of the receiving antenna axis with the transmission axis (together with phase and amplitude adjustments to be described) makes possible some elimination of the interference signal, provided that the interfering source is not on the alignment of the receiver and transmitter. By moving the receiving location (while maintaining axis alignment with the transmitter), variable amounts of a second polarization component are introduced into the second antenna, and by adjusting the axis properly, the components can be phased properly with each other so that the interference signals may be eliminated whereas a useful fraction of the signal picked up from the transmitter would be passed.

In the receiving systems thus far described, the two antennas (or the antenna array in combination with the two polarization-sensitive networks) are always respectively receptive to oppositely circularly polarized waves. Likewise, in the receiving system of FIG. 6, antennas 41 and 42 respond to circularly polarized waves of opposite sense. The wave picked up by antenna 42 is modified both in phase and amplitude by phase shifter 43 and amplitude adjuster 44, and is passed finally into a summing or difference circuit 45. This adjusted polarized wave is compared in circuit 45 with another wave received by polarized antenna 41, before passage to the receiver proper. Where the incoming signal levels of the respective polarized waves are rather small, it may be advisable to include a pair of amplifiers 46 and 47, so that the proper level of signal may be applied to circuit 45.

In FIG. 6, the differencing network is shown in the radio-frequency circuit, whereas in FIG. 4 it is shown in the output circuit of the receiver. For the connection in FIG. 4, it is preferable that the receiver be operating in a very nearly linear mode and be using amplitude type of modulation.

FIGS. 7A and 7B, respectively, illustrate two possible phase-shifting circuits 48 and 49 capable of being utilized in the phase shifter 43 of FIG. 6, it being understood that other phase-shifting circuits may be used just as well. The phase-shifting circuit 48 comprises a goniometer stator 50 fed by antenna 42, directly (in the case of one coil 51) and through a condenser 52 (in the case of the other coil 53) to provide a phase-shifted signal in the said other coil 53. The rotor coil 54 is suitably adjustable in angle to provide an output signal of proper phase. In the second phase-shifting circuit 49, a transformer 55 has its secondary center tap grounded, while the secondary extremities are series-connected to a variable resistor 56 and condenser 57. The junction between resistor and condenser provides an output terminal from which the phase-shifted signal is taken. The signal output may be phase-shifted by the adjustment of either or both resistor 46 and condenser 57.

There is illustrated in FIG. 8 a representative circuit for comparing the received circularly polarized signals, as for use at 45 in FIG. 6.

The difference circuit of FIG. 8 comprises a pair of electron discharge devices 59 and 60 each having an input grid 61 and 62, respectively, fed from the antenna 41 on the one hand, and from the antenna 42 (phase and amplitude corrected at 43—44) on the other hand. The anode electrodes 63 and 64 are connected through a common impedance 65 and the output 66 is taken from anode 64. The cathodes 67 and 68 are commonly connected through a common cathode impedance 69 to ground 70. The circuit illustrated in FIG. 8 is an amplifier whose output is a linear combination of the two input signals, or expressed mathematically;

$$E\ \text{out}=K_1E_{41}-K_2E_{42}$$

where $E$ out=the resulting output signal $E_{41}$=the signal output of antenna 41, $E_{42}$=the signal output of antenna 42 as phase and amplitude corrected at 43—44, and $K_1$ and $K_2$—constants.

In general, it will be appreciated that any antenna (or any antenna and associated polarization-sensitive network) which responds to circularly polarized waves of only one sense may be used. FIGS. 2 and 3 show means for generating circularly polarized waves (elliptically polarized waves in general), using what is essentially a two-phase array consisting of dipoles. Any antenna which transmits linearly polarized waves may be utilized. Moreover, it is not necessary that a two-phase system be employed. For example, a three-phase system using three dipoles could be used, or a four-phase system using four dipoles, and so on. In the event more than two phases are utilized, phase shifters 17 and 18 should be modified to produce balanced outputs.

Although the invention has been described in connection with certain preferred forms, it is understood that the present disclosure has been made only by way of example and that numerous changes in the details of construction and the combination and arrangement of parts may be resorted to without departing from the spirit or scope of the invention as hereinafter claimed.

What is claimed is:

In a circular polarization communications system, crossed dipole radiating antenna elements comprising a first pair of elements perpendicular to a second pair of elements, two transmitters operating on substantially the same carrier frequency, first phase-splitting means connecting the output of one of said transmitters to the respective pairs of said dipole elements to continuously produce a first circularly polarized radiation from said antenna for the output of said first transmitter, second phase-splitting means connecting the output of the other of said transmitters to the respective pairs of said dipole elements to continuously produce a second circularly polarized radiation from said antenna for the output of said second transmitter, said respective radiations being in opposite circularly polarized senses, and receiving means, said receiving means including a crossed dipole antenna having perpendicular pairs of elements corresponding to those of said first-mentioned antenna, first circuit means connected to the elements of said second antenna and responsive to circularly polarized signals rotating in one electrical sense, and second circuit means connected to the elements of said second antenna means and responsive to circularly polarized signals rotating in the opposite electrical sense.

References Cited in the file of this patent

UNITED STATES PATENTS

| | | |
|---|---|---|
| 1,556,137 | Weagant | Oct. 6, 1925 |
| 2,454,907 | Brown | Nov. 30, 1948 |
| 2,473,613 | Smith | June 21, 1949 |
| 2,495,399 | Wheeler | Jan. 24, 1950 |
| 2,619,635 | Chait | Nov. 25, 1952 |